Nov. 21, 1944.  F. C. P. HENROTEAU  2,363,416
VEHICLE POSITION INDICATING MEANS
Filed Jan. 2, 1943   2 Sheets-Sheet 1

Inventor:
F. C. P. Henroteau
By Alex. E. MacRae
Attorney.

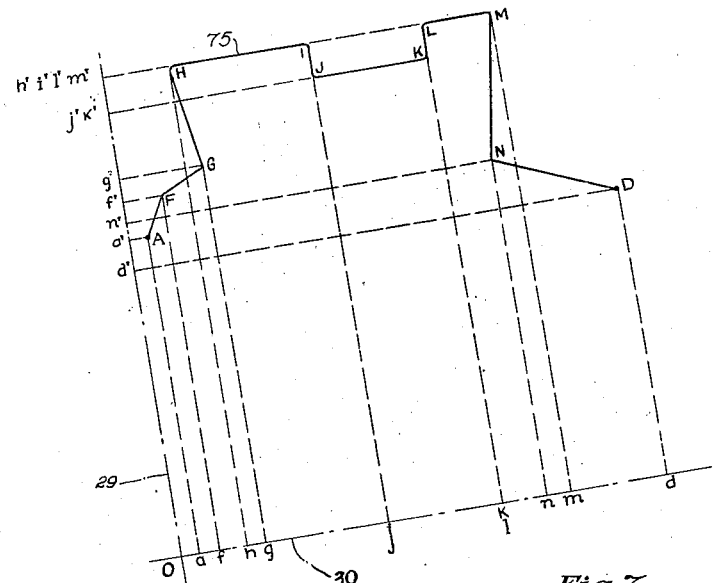

Patented Nov. 21, 1944

2,363,416

UNITED STATES PATENT OFFICE 2,363,416

VEHICLE POSITION INDICATING MEANS

François Charles Pierre Henroteau, Ottawa, Ontario, Canada

Application January 2, 1943, Serial No. 471,180
In Canada December 24, 1942

12 Claims. (Cl. 246—124)

This invention relates to vehicular traffic systems, and more particularly to means for ascertaining the positions of vehicles in such a system at any time during their route of travel.

In city passenger transportation systems of the street railway or bus type, the impossibility of maintaining an accurate time schedule due to traffic and passenger flow conditions is well recognized. The advantages in time saving and convenience to prospective passengers, if it were possible for them to ascertain the positions of vehicles on a certain passenger line in advance of their procedure to a vehicle stop, are quite apparent. Moreover, the value to traffic managers of such systems of means to determine the exact positions of all vehicles on a particular route at any time will be apparent, particularly in that the movement of vehicles could be much more efficiently and economically controlled.

The object of the present invention is to provide convenient and inexpensive means for substantially instantaneously and at any time ascertaining the positions of vehicles in a fixed route transportation system.

Figure 1:
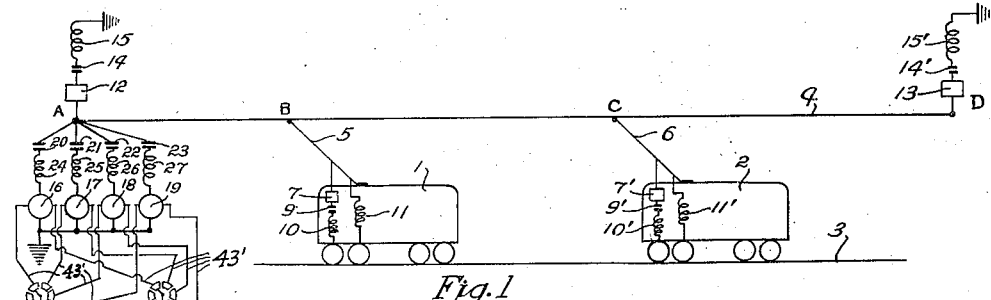
Figure 2:
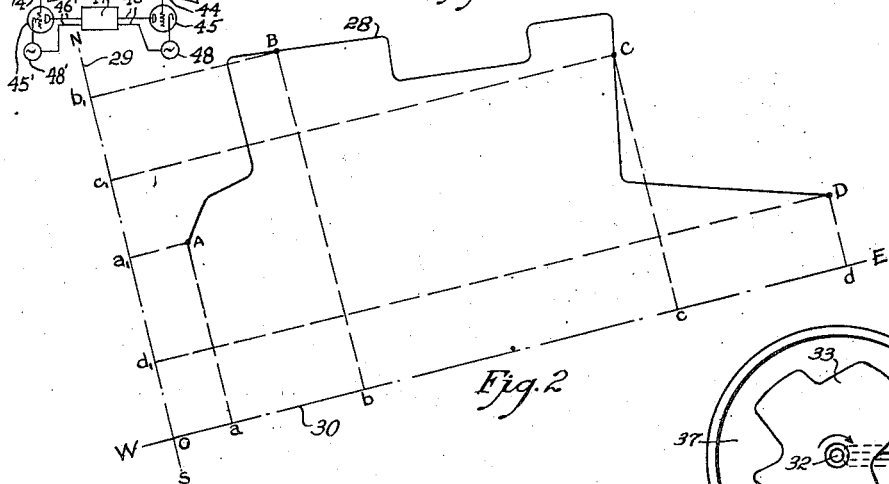
Figure 3:
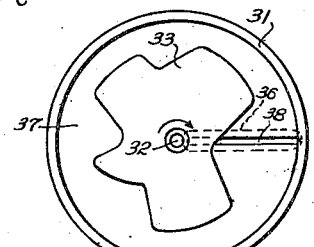
Figure 4:
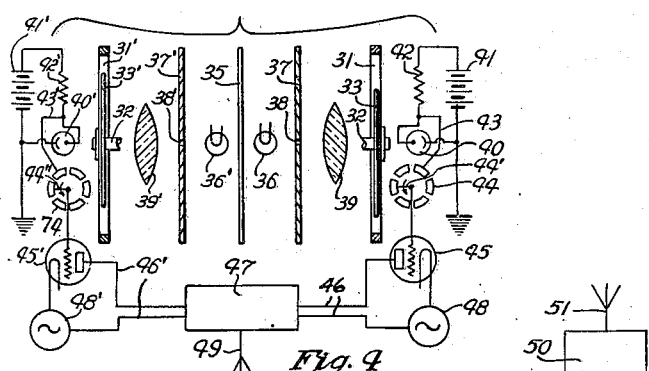
Figure 6:
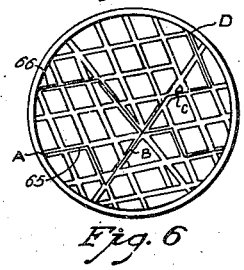
Figure 5:
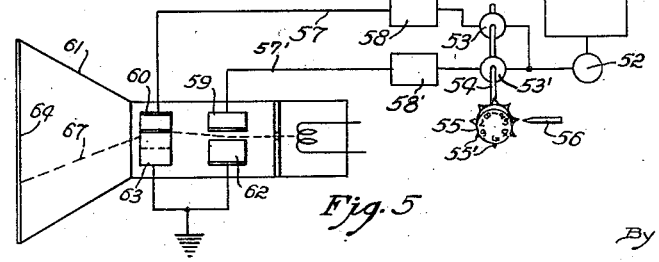

The invention will be described in detail with reference to the accompanying drawing, which illustrates diagrammatically a means for carrying out the same and in which, Figure 1 is a more or less diagrammatic representation of the transmitting apparatus of the invention as applied to street railway vehicles, Figure 2 represents one route of the street railway line with its terminals and illustrative positions of a car on the line and the manner of determining abscissae and ordinates of these points, Figure 3 is an end view of one of the ammeter devices shown diagrammatically in Figure 1, Figure 4 is an exploded view of an ammeter device assembly and its associated circuit connections, Figure 5 is a diagrammatic view of a signal receiving and translating device, Figure 6 is a plan view of the screen of the signal translating device of Figure 5, Figure 7 is a diagram of a vehicular route illustrating the abscissae and ordinates of various points on the route, Figure 8 is an end view of an ammeter device illustrating a manner of forming means for indicating the abscissae values shown in Figure 7, and Figure 9 is an end view of an ammeter device illustrating a manner of forming means for indicating the ordinate values shown in Figure 7.

Referring to Figure 1, 1 and 2 are street cars on a track 3 having a trolley wire 4, the terminals of which are shown as A and D. The street cars have trolleys 5 and 6, their positions on the wire at a determined time being indicated by the letters B and C, respectively. It will be understood that the wire 4 is intended to represent a complete street car route, which may be one of several in a system.

In accordance with the invention, an oscillator is mounted on each street car of a system as indicated at 7 and 7' on street cars 1 and 2, respectively. Each oscillator is fed by the main low frequency or direct current (not shown) employed for the propulsion of the car, and is adapted to produce a much weaker current of higher but well determined frequency. The frequency of the current produced by each oscillator varies from that of each of the other oscillators. Each oscillator is connected on one side to the trolley wire, as shown, and on the other side to the rail 3, that is, to ground, through a filter in resonance to the respective high frequency current produced. The filter is shown as including in cars 1 and 2, respectively, a condenser 9, 9' and inductance 10, 10'. Respective inductances or chokes 11, 11' are also placed between trolleys 5, 6 and the driving motors of the cars in order to prevent the high frequency current from leaking to the motors and to ground.

At either end of the trolley line are connected similar oscillators 12 and 13, also producing currents of higher, well-determined, but different frequencies. These oscillators are also provided with resonant filters comprising the condensers 14, 14' and inductances 15, 15'.

At the terminal A of the trolley line are located a plurality of devices 16, 17, 18, 19, which are somewhat similar in structure to an ammeter in that they include an element revolvable to an extent proportional to the amperage received thereby. Each device is connected to terminal A through a filter consisting of a respective condenser 20, 21, 22, 23 and a respective inductance 24, 25, 26, 27, the filter of each device being in resonance with the frequency of the current from the oscillators 12, 7, 7', 13 at A, B, C, D, respectively.

It will thus be apparent that devices 16, 19, receiving current from fixed oscillators 12, 13 at terminals A, D, will produce a fixed reading, whereas devices 17, 18, receiving current from moving oscillators 7, 7' at B, C will produce a reading varying in accordance with the distance between A and B or C since the amperage will vary due to the increased or decreased resistance of the trolley wire depending on the distance of travel of the current therethrough.

Each of the other vehicular routes in the system are provided with similar equipment but the range of frequencies of the currents produced by the group of oscillators on each route differs from that of all of the other routes.

Referring now to Figure 2, a fixed vehicular route 28 is represented therein, having terminals A, D and positions of two vehicles thereon indicated at B, C. In accordance with the invention, values of abscissae and ordinates corresponding to terminal points A, D and to various points along the route are obtained. This is accomplished by providing a north-south line 29 and an east-west line 30 intersecting at an arbitrarily chosen point O. Points A, D and, for instance, points B, C, are projected on the lines 29 and 30 and the abscissae $Oa$, $Ob$, $Oc$, $Od$, and ordinates $Oa_1$, $Ob_1$, $Oc_1$, $Od_1$, obtained. In accordance with the invention, the ammeter devices 16, 17, 18, 19 are adapted to provide readings corresponding respectively to abscissa $Oa$ and ordinate $Oa_1$, abscissa $Ob$ and ordinate $Ob_1$, and so forth, in a manner now to be described.

Figures 3 and 4 illustrate an ammeter device, such as 17, which includes a pair of annular frames 31 and the usual central supporting shaft 32 which, in ordinary ammeters, carries the indicating pointer and rotates in accordance with the amperage of the circuit in which it is connected. In place, however, of the usual pointer, a pair of plates 33 and 33', each with an irregular edge, are fixed to the shaft 32, each plate being concentrically arranged within a respective annular frame 31, 31'.

The plate 33 constitutes an abscissa indicating means while the plate 33' constitutes an ordinate indicating means. Each plate has an irregularly shaped periphery, which will vary in accordance with the particular vehicle route to which it relates, the particular shape illustrated in Figure 3 having been arbitrarily chosen for illustrative purposes. The periphery of the abscissa indicating plate is so shaped that the distance between successive points on the irregularly shaped periphery and the radially opposite point on the inner surface of the annular frame is proportional to the length of the respective abscissae from $Oa$ to $Od$, inclusive. Thus, as the plate rotates past an arbitrarily chosen fixed point on the inner surface of the annular frame, the distance between such fixed point and the changing radially opposite point on the plate will vary in accordance with the shape of the periphery of the plate, this distance at any point of rotation being proportional to the respective abscissa, $Oa$ to $Od$ as the case may be. It will be apparent that, given the abscissa values from $Oa$ to $Od$, inclusive, the plate 33 may be readily shaped to provide the indication described. The periphery of the ordinate indicating plate 33' is similarly shaped to provide an indication, along a correspondingly chosen line, of all the ordinate values from $Oa_1$ to $Od_1$, inclusive. However, it will be understood that, for any given position of the two plates, the ordinate represented by one plate is that of the abscissa represented by the other plate. It will be appreciated that, since the current received by ampere devices 16 and 19 connected to terminals A and D is of fixed intensity, the plates 33 and 33' therein will, after initial adjustment, remain in substantially fixed position whereas, since the current received by ampere devices 17 and 18 connected to moving vehicles varies in intensity with movement of the vehicles, the plates 33 and 33' therein will rotate in response to such variations in current intensity.

A manner of developing the peripheries of plates 33 and 33' to provide abscissa and ordinate indicating means for a particular vehicular route will now be described with particular reference to Figures 7, 8 and 9.

A vehicular route 75 with terminals A and D is shown in Figure 7. The route, as illustrated, changes direction at the points F, G, H, I, J, K, L, M and N. The ordinates and abscissae of these points and of terminals A and D are plotted on the lines 29 and 30 which intersect at the point O. Thus the abscissae values $Oa$, $Of$, $Og$, $Oh$, $Oi$, $Oj$ (equal to $Oi$), $Ok$, $Ol$ (equal to $Ok$), $Om$ and $On$, and the ordinate values $Oa'$, $Of'$, $Og'$, $Oh'$, $Oi'$ (equal to $Oh'$), $Oj'$, $Ok'$ (equal to $Oj'$), $Ol'$ (equal to $Oh'$), $Om'$ (equal to $Oh'$), and $On'$, are obtained.

Referring to Figure 8, on the circumference of circle 76, representing the inner surface of annular frame 31, points A', F', G', etc., are located, the distances A'F', F'G', G'H', etc., being proportional to the unidirectional distances AF, FG, GH, etc. on the route, the entire distance A'D' being representative of the route length. Radii 77 are drawn through each of the points A', F', etc. From point A' is marked off on its radius a distance A'O' proportional to abscissa $Oa$, and from point F" is marked off on its radius a distance F"O' proportional to abscissa $Of$, and so forth. The irregular line 78 joining all the points O' represents the effective peripheral portion of plate 79, as shown, which corresponds to plate 33 in Figure 3. The plate 79 has an axial portion 80 for mounting on the shaft 32. The radial distances from all points on the irregular line 78 and the circumference of the circle 76 are substantially proportional to the corresponding abscissae.

Referring to Figure 9, on the circumference of a circle 81, representing the inner surface of annular frame 31', points A', F', G', etc. are located, to represent proportionally the unidirectional distances AF, FG, GH, etc., radii 82 being drawn through such points. From point A' is marked off on its radius a distance A'O" proportional to ordinate $Oa'$, and from point F" is marked off on its radius a distance F"O" proportional to ordinate $Of'$, and so forth. The irregular line 83 joining all the points O" represents the effective peripheral portion of plate 84, as shown, which corresponds to plate 33'. The plate 84 has an axial portion 85 for mounting on the shaft 32. The radial distances from all points on this irregular line 83 and the circumference of the circle 81 are substantially proportional to the corresponding ordinates.

In accordance with the invention, the indicated radial distances are each initially translated into a thin light beam of a width equal to the indicated distance. This is accomplished by providing, at the central plane of the device, an opaque plate 35 with an incandescent lamp 36, 36' on either side thereof. Between lamp 36 and plate 33 and between lamp 36' and plate 33' is a respective opaque plate 37, 37' each having an elongated slit or opening 38, 38' therein opposite to and coinciding with a radial line passing through the arbitrarily chosen fixed point referred to above. As shown in Figure 3, this slit extends from a point adjacent the axis of the device to a point opposite the inner surface of the annular frame 31 or 31'. The plates 37 and 37' are identical in form. It will be observed that, with the lamps 36 and 36' illuminated, a beam of light will pass through the slits 38 and 38' in the plates. The thin, wide beam produced by the slit 38 enters the annular frame 31 while the beam produced by the slit 38' enters the annular frame 31'. Referring again to Figure 3, it will be observed that, while the outer portion of the beam may pass without interruption through the frame 31, the inner portion of the beam will fall upon the plate 33 and be interrupted thereby. As the plate 33 rotates, a greater or less portion thereof will engage the beam due to the irregular periphery of the plate. Thus, the width of the beam which passes through the frame 31 will vary in accordance with the rotative position of the plate 33. Similarly, the width of the beam which passes through the frame 31' will vary in accordance with the rotative position of the plate 33'. The distance between the periphery of the plate 33 or 33' and the inner surface of the frame 31 or 31' along the chosen radius (such distance being representative of an abscissa or ordinate as previously described) is therefore translated into a thin light beam of a width equal to such distance. In order to prevent wide diffusion of the light beam, a respective lens 39, 39' may be provided between plates 37 and 33 and plates 37' and 33'. The plates 37, 37' and 33, 33' coincide with the conjugate focal planes of the respective lens 39, 39' and only a slit of light, conjugate image of the slits 38, 38' is formed in the plane of each plate 33 and 33'.

Each of the ammeter devices 16, 17, 18 and 19 includes means for translating the pair of light beams produced thereby into corresponding wireless signals of intensities proportional to the width of the beams. This means comprises a photoelectric cell 40, 40' in the path of each beam. The light beam striking the cathode of the cell will, of course, cause the cathode to transmit a quantity of electrons to the anode of the cell, the quantity being proportional to the size of the beam, which, as previously stated, varies in accordance with the abscissa or ordinate it represents. Each cell has the usual circuit with battery 41, 41' and resistance 42, 42'.

A pair of contact devices 44, 74 are provided for the group of ampere responsive devices 16, 17, 18 and 19. Each contact device comprises a series of annularly arranged spaced stationary contacts 75 and a constantly rotating arm 44', 44" adapted to engage each contact in succession. Each device has at least sufficient stationary contacts to correspond with the number of ampere responsive devices present in a particular vehicular route of the system. Leads 43 from the abscissa indicating sides of the ampere devices 16, 17, 18, 19 are each connected to a different contact of one of the contact devices, as indicated in Figure 1. Leads 43' from the ordinate indicating sides of the ampere devices are each connected to a different contact of the other contact device. It will be understood that the arms 44', 44" are so synchronized in their movement that they engage simultaneously the contacts connected to one ampere device. Each arm 44', 44" is connected to the grid of a controlling three-electrode tube 45, 45'. Thus, on the grid of tube 45 there will be impressed successively and intermittently a plurality of series of current signals, each series being of different intensity as follows—

C1—from ampere device 16 of fixed intensity representative of fixed abscissa $Oa$ of terminal A.

C2—from ampere device 17 of varying intensity representative of varying abscissa $Ob$ of moving vehicle B.

C3—from ampere device 18 of varying intensity representative of varying abscissa $Oc$ of moving vehicle C.

C4—from ampere device 19 of fixed intensity representative of fixed abscissa $Od$ of terminal D.

Similarly, on the grid of tube 45' there will be impressed successively and intermittently a plurality of series of current signals C5, C6, C7 and C8 each series being of different intensity and representative of the ordinates $Oa_1$, $Ob_1$, $Oc_1$, and $Od_1$.

The tubes 45, 45' are in respective circuits 46, 46', both of which lead to a broadcasting station 47. It will be apparent that there will be a pair of contact devices 44, 44', together with a pair of tubes 45, 45', with their circuits 46, 46', for each vehicular route in the system to which the apparatus is applied.

Included in circuit 46 is an oscillator 48 which produces a current of ultrasonic frequency in the circuit, such frequency being indicated by the character $F^1$. The intensity of this current in traversing the tube 45 from the filament to the plate thereof is controlled by the grid and will be proportional to the signal intensities C1, C2, C3, C4 transmitted to the grid by the photoelectric cell. Similarly, an oscillator 48' is included in circuit 46' to produce a current of ultrasonic frequency in that circuit, such frequency being different from $F^1$ and indicated by the character $F^2$. The intensity of this current will be proportional to the signal intensities C5, C6, C7, C8 transmitted to the grid of tube 45'. The currents are amplified and modulated at the broadcasting station 47 and are emitted as wireless signals from the antenna 49 thereof. There will thus be emitted two series of wireless signals, one series of frequency $F^1$ of varying intensities C1, C2, C3, C4 and the other series of frequency $F^2$ of varying intensities C5, C6, C7, C8. It will be understood that, for a second vehicular route in the system, the second pair of series of wireless signals produced for such route would be varying frequencies $F^3$, $F^4$, respectively.

The broadcasting station may be an existing station, the ultra or supersonic signals transmitted therethrough by the present device being of frequencies a little greater than those corresponding to high pitch sounds whereby they are inaudible and may thus be broadcast simultaneously with regular audible broadcasts.

Figure 5 illustrates means associated with an ordinary receiving set 50 for translating the supersonic signals received by the antenna 51 thereof into readily observable information. The output of the receiving set is led through a rheostat 52 from which two branches 57, 57' lead through respective variable filters 53, 53'. The filters 53, 53' are mounted for simultaneous control on a shaft 54 having a regulating knob or handle 55 thereon. The knob 55 has designated indicating pointers 55' thereon adapted to register with a cooperating stationary marker 56. Each pointer is adapted to indicate one vehicular route in a system and rotation of the knob to a route designation is adapted to adjust the filters 53, 53' to permit passage of currents of the frequency range for the selected route.

Thus, for one route, filter 53 would be adjusted to permit passage of the current of frequency $F^1$ only while the other filter 53' would be adjusted to permit passage of the current of frequency $F^2$ only. Similarly for a second route, filters 53, 53' may be adjusted to permit passage respectively of the pair of currents of frequencies $F^3$ and $F^4$ representative of such route.

The various pairs of currents are transmitted by the branches 57, 57', through amplifiers and redressers 58, 58', to produce deflecting potentials on the respective plates 59 and 60 of an ordinary cathode ray oscillograph 61, the opposing deflecting plates 62 and 63 of which are connected to ground as shown.

Thus, for one of the two frequencies (representing abscissa and ordinate values) produced by oscillators 48, 48' for one vehicular route, the deflecting plate 59 will successively and intermittently receive a series of constant charges differing in intensity (as the rotating arm 44' passes from one stationary contact to the other) representing the abscissa values of first, the terminal A, then of the first vehicle on the route, then of the second vehicle, and so on, and finally of the terminal D. Similarly, the deflecting plate 60 will successively and intermittently receive a series of constant charges differing in intensity and representing the corresponding ordinate values. When the charges on plates 59 and 60 are zero, the electron beam 67 of the cathode ray oscillograph is not deflected and forms a bright point on the screen 64 which bright point corresponds to the original point O shown in Figure 2. For a pair of constant charges taken on by plates 59 and 60 and corresponding to a terminal or a vehicle position the electron beam will be deflected by the electrostatic attraction of these charges. A new bright point will thus be formed on the fluorescent screen, the deflection of this new bright point, with respect to the original non-deflected bright point corresponding to the particular abscissa value being caused by the charge on plate 59 and the deflection corresponding to the particular ordinate value being caused by the charge on plate 60.

If the rotating arms 44' and 44 have a relatively great speed, as is preferable, the jump from one to the next pair of charges on 59 and 60 will be rapid and a succession of intermittent bright points will be formed on the fluorescent screen 64, corresponding respectively to the two terminals of the vehicle route and to the positions of the various vehicles on the route. The intermittance being of very rapid order, all the bright spots will appear under casual vision as a plurality of non-intermittently appearing spots due to normal retention of vision, although actually the plurality of spots are formed by the same single electron beam 67.

The screen 64, as shown in Figure 6, has imprinted thereon a map of the city or district through which the vehicular routes of the system run. Such routes are also imprinted in heavy lines on the map, two such routes 65 and 66 being shown. The absolute intensity of the radio signals received by the antenna 51 being variable, but the ratio of the intensities of these signals being constant, the absolute values of the charges on 59 and 60 may be changed by manipulating the rheostat 52, whereas their relative values remain unchanged. The rheostat, in practice will be adjusted until it is observed that the bright points on the screen representing the two terminals of the chosen vehicular route coincide with the terminals A and D of the corresponding route shown on the map. When such adjustment is made, the bright points representing the vehicle positions on the chosen route will appear along the route imprinted on the screen and will represent the exact positions of the vehicles thereon. The bright spots will of course move along the route as the corresponding vehicles move.

The equipment described thus provides means for conveniently and instantaneously ascertaining the position of all vehicles on any one of a plurality of fixed vehicular routes in a transportation system.

The equipment is inexpensive and may be readily installed in existing broadcasting stations and domestic receiving sets. Receiving sets equipped with the structure of Figure 5, as previously described, might also be installed on vehicles themselves so that operators thereof may properly time their progress along a certain route in relation to the other vehicles on the same or related routes.

It will also be apparent that the invention may be applied to systems other than electric railway lines, such as electric bus lines, or any vehicular route system wherein an electrically conductive wire corresponding to the trolley wire 28 is provided along the vehicular route and with which the vehicles moving along the route have electrical contact. Thus, it may be applied to auto-bus lines, in which case it will be necessary to provide a resistance wire extending along each route to serve the function of the trolley wire as described above, with means providing contact between the vehicles on the route and the wire.

Furthermore, instead of utilizing the trolley wire, in the manner described, a second wire of somewhat higher resistance may be installed along each route with any suitable means providing a connection between such wire and the various oscillators on the vehicles.

I claim:

1. In apparatus for determining the positions of vehicles in a fixed route vehicular traffic system, means on each of said vehicles for producing an alternating current, said currents having each a different frequency, a conductor having connection with each of said vehicles for conducting said currents to a fixed point, means for translating said currents into wireless signals representing a plurality of vehicles, the signals representing each vehicle having a characteristic differing from that of the signals representing the other vehicles and also having another characteristic varying in accordance with the position of the vehicle, and means for receiving and translating said signals into a visible representation.

2. In apparatus for determining the positions of vehicles in a fixed route vehicular traffic system, means on each of said vehicles for producing an alternating current, said currents having each a different frequency, a conductor having connection with each of said vehicles for conducting said currents to a fixed point, means for translating said currents into a plurality of wireless signals, each representing a particular vehicle and varying in intensity in accordance with the distance of said vehicle from a fixed point, and means for receiving and translating each of said signals into a visible representation.

3. In apparatus for determining the positions of vehicles in a fixed route vehicular traffic system, means on each of said vehicles for producing an alternating current, said currents having each a different frequency, a conductor having connection with each of said vehicles for conducting said currents to a fixed point, means for translating said currents into a plurality of pairs of wireless signals, each pair representing a particular vehicle and varying in intensity in accordance with the position of said vehicle, and means for receiving and translating each pair of said signals into a visible representation.

4. In apparatus for determining the positions of vehicles in a fixed route vehicular traffic system, means on each of said vehicles for producing an alternating current, said currents having each a different frequency, a conductor having connection with each of said vehicles for conducting said currents to a fixed point, means for translating said currents into wireless signals of fixed frequency, said signals being of a different frequency for each vehicle and varying in intensity in accordance with the position of the respective vehicle, means for broadcasting said signals, and means for receiving and translating said signals into a visible representation.

5. Apparatus for determining the positions of vehicles in a fixed route vehicular traffic system comprising means on each of said vehicles for producing an alternating current, said currents having each a different frequency, a conductor having connection with each of said vehicles for conducting said currents to a fixed point, means for translating each of said currents into a wireless signal which varies with the intensity of the current and means including a cathode ray oscillograph for receiving said signals and translating them into cathode ray deflections.

6. Apparatus for determining the positions of vehicles in a fixed route vehicular traffic system comprising means on each of said vehicles for producing an alternating current, said currents having each a different frequency, a plurality of amperage responsive devices located at a fixed point, a conductor having connection with each of said vehicles for conducting each of said currents to a respective one of said devices, means for successively and intermittently translating the currents received by said devices into respective wireless signals of corresponding frequencies and varying with the intensities of the currents and means for receiving each successive signal and translating it into a visible ray.

7. Apparatus for determining the positions of vehicles in a fixed route vehicular traffic system comprising means on each of said vehicles for producing an alternating current, said currents having each a different frequency, a plurality of amperage responsive devices located at a fixed point, means conducting each of said currents to a respective one of said devices, means for translating the current received by each device into a pair of light beams of a size varying in accordance with the amperage of the current, means for translating each beam into a wireless signal of a frequency different from that of the other, and means including a cathode ray oscillograph for receiving each pair of said signals and translating them into a cathode ray.

8. Apparatus for determining the positions of vehicles in a fixed route vehicular traffic system comprising means on each of said vehicles for producing an alternating current, said currents having each a different frequency, a plurality of amperage responsive devices located at a fixed point, means conducting each of said currents to a respective one of said devices, each said device having amperage responsive means indicating the abscissa value of substantially all points between and including the terminals of a vehicular route, amperage responsive means indicating the ordinate value of substantially all said points, means translating each said pair of abscissa and ordinate values into respective light beams varying in size in accordance with the value, means for successively and intermittently translating each beam into a wireless signal of a frequency different from that of the other, and means for receiving each pair of said signals and translating them into a visible ray.

9. Apparatus for determining the positions of vehicles in a fixed route vehicular traffic system comprising oscillator means on each of said vehicles for producing an alternating current, said currents having each a different frequency, a plurality of amperage responsive devices located at a fixed point, means conducting each of said currents to a respective one of said devices, each said device having a frame, a pair of indicating plates rotatable in said frame about a fixed axis in accordance with the amperage of the current received thereby, the peripheries of said plates respectively being so shaped that the distance along a fixed radius between points on such periphery and a fixed point on said frame is proportional to the abscissa or ordinate value of substantially all points between and including the terminals of a vehicular route, means producing a pair of light beams each of a width equal to a respective one of said distances, photoelectric means for translating each of said beams into a wireless signal of a frequency different from that of the other, means for broadcasting said signals, means for receiving said signals, means for translating each said pair of signals into a pair of currents of corresponding frequencies, and a cathode ray oscillograph for translating said currents into a visible ray.

10. Apparatus for determining the positions of vehicles in a fixed route vehicular system as defined in claim 9, said cathode ray oscillograph having a fluorescent screen and a vehicular route traced on said screen, said ray being adapted to impinge on a point along said route on the screen.

11. Apparatus for determining the positions of vehicles in a fixed route vehicular system comprising means for producing an alternating current at the terminals of each route in the system and on each vehicle in system, each current produced differing in frequency from the others, a plurality of amperage responsive devices located at one of the terminals of each route, means conducting each current produced in a route to a respective one of said devices, each said device having a pair of amperage responsive means indicating the abscissa or ordinate value respectively of substantially all points between and including the terminals of a respective vehicular route, means producing a pair of light beams corresponding in size respectively to said abscissa and ordinate values, means for successively and intermittently translating each of said beams into a wireless signal of a frequency differing from that of the other and also differing from that of each signal produced by each of the other of said devices, each pair of signals produced in any one route being in a predetermined range of frequencies differing from that of each other route, means for receiving each pair of signals and for translating the same into a pair of currents of corresponding frequencies, filter means for passing the pairs of currents in one of said predetermined ranges, and a cathode ray oscillograph for translating each pair of currents into a visible ray.

12. Apparatus for determining the positions of vehicles in a fixed route vehicular system as defined in claim 11, said cathode ray oscillograph having a fluorescent screen, a map traced on said screen and a plurality of vehicular routes traced on said map, said ray being adapted to impinge on a point along one of said routes on the screen.

FRANÇOIS CHARLES
PIERRE HENROTEAU.